United States Patent [19]

Sylvan

[11] Patent Number: 5,457,738
[45] Date of Patent: Oct. 10, 1995

[54] METHOD AND SYSTEM FOR SEARCHING AN ON-LINE DIRECTORY AT A TELEPHONE STATION

[75] Inventor: Loren M. Sylvan, Denver, Colo.

[73] Assignee: U S West Advanced Technologies, Inc., Boulder, Colo.

[21] Appl. No.: 381,147

[22] Filed: Jan. 30, 1995

Related U.S. Application Data

[63] Continuation of Ser. No. 277,740, Jul. 20, 1994, abandoned, which is a continuation of Ser. No. 35,841, Mar. 23, 1993, abandoned.

[51] Int. Cl.$^6$ .................................................. H04M 11/00
[52] U.S. Cl. ............................ 379/96; 379/201; 379/354
[58] Field of Search ........................ 379/88, 90, 93–110, 379/201, 207, 354–357; 345/173, 104; 178/18, 19

[56] References Cited

U.S. PATENT DOCUMENTS

| | | | |
|---|---|---|---|
| 4,431,870 | 2/1984 | May et al. | 379/354 |
| 4,659,876 | 4/1987 | Sullivan et al. | 379/354 |
| 4,870,677 | 9/1989 | Di Santo et al. | 379/354 |
| 4,885,580 | 12/1989 | Noto et al. | 379/96 |
| 4,899,377 | 2/1990 | Bauer et al. | 379/354 |
| 5,179,587 | 1/1993 | Bock et al. | 379/94 |

FOREIGN PATENT DOCUMENTS

| | | |
|---|---|---|
| 0354703 | 2/1990 | European Pat. Off. . |

OTHER PUBLICATIONS

Canon, "Navigator Desktop Office" brochure, © 1990.

*Primary Examiner*—Wing F. Chan
*Attorney, Agent, or Firm*—Brooks & Kushman

[57] ABSTRACT

A method and system are disclosed for processing and displaying objects to permit a search of a database by a user of a telephone station. The telephone station includes a computer, a display device having a display screen adapted to cooperate with a pointing device. The method includes providing a database and a first index list. The method further includes displaying an array of objects on the display screen. The method also includes receiving a first set of signals relating to at least one object from the displayed array of objects; creating a first search string based on the first set of signals; displaying a plurality of entries of the first index list based on the value of the first search string; and receiving a signal relating to one of the displayed entries, the signal identifying an entry selected by the user. The method finally includes the step of displaying at least one object representing a phone number associated with the selected entry.

12 Claims, 6 Drawing Sheets

METHOD AND SYSTEM FOR SEARCHING AN ON-LINE DIRECTORY AT A TELEPHONE STATION

This is a continuation of copending application Ser. No. 08/277,740 filed on Jul. 20, 1994 now abandoned, which is a continuation of Ser. No. 08/035,841, filed Mar. 23, 1993 now abandoned.

CROSS-REFERENCE TO RELATED APPLICATION

This invention is related to a commonly owned application being filed concurrently with this application. The related application is entitled "Computer Interface Method and System."

TECHNICAL FIELD

This invention relates to methods and systems for processing and displaying information and, in particular, to methods and systems for processing and displaying information at a telephone station to permit a search of a database.

BACKGROUND ART

Currently, products are available which permit a user of a computer to search an on-line telephone directory for the telephone number of a specific person or company. Some of these products incorporate a stepwise search technique. Typically, this technique requires the user to use a keyboard to type the letters of the name of the person or company whose telephone number is desired. As each successive letter is typed, the name matching the typed letters is displayed on the screen.

While these products make it possible for the user to find the desired telephone number, they have significant disadvantages. First, the user is required to use a keyboard to define the search parameters. Users who are less adept with the layout of a keyboard will be less efficient than users who are more familiar with the layout of a keyboard. Second, the user is required to search only by name. If, for example, the user does not know the name of a company but knows other information such as the first digit of the phone number or the line of business of the company, locating the telephone number of the company using conventional methods would prove nearly impossible.

A need therefore exists for a product which addresses the shortcomings of the products presently available. A need exists for a product which provides the user an alternative way to define the search parameters without requiring the use of a keyboard. Furthermore, a need exists for a method and system which allows the user to constrain the search other than by name alone.

SUMMARY OF THE INVENTION

The present invention described and disclosed herein comprises a method and system for processing and displaying objects to permit a search of a database upon receiving input through a display device adapted to cooperate with a pointing device.

An object of the present invention is to provide a method and system for processing and displaying objects to permit a search of a database using an intuitive user interface.

Another object of the present invention is to provide a method and system for processing and displaying objects to permit a search of a database which allows a user to define a search string using a single pointing device.

In carrying out the above objects and other objects of the present invention, a method is provided for processing and displaying objects to permit a search of a database at a telephone station. The method includes the steps of providing a database for storing a multiplicity of information records. The information records must include a telephone number and a first index. The method further includes providing a first index list for identifying information records based on the first index.

Next, the method includes the steps of displaying an array of objects on the display screen of the telephone station and receiving a first set of signals relating to at least one object from the displayed array of objects. The at least one object being selected by a user using the pointing device. The method additionally includes the step of creating a first search string having a value to constrain the first index list based on the first set of signals.

Once the first search string has been created, the method requires the step of displaying a plurality of entries of the first index list on the display screen. The displayed entries are based on the value of the first search string. The method additionally includes the step of receiving a signal relating to one of the displayed entries of the first index. This signal identifies an entry selected by the user using the pointing device. Finally, the method includes displaying at least one object representing the desired telephone number.

The preferred method includes the steps of the previously discussed method wherein the information records further include a second index for further defining the search.

The preferred method further includes the step of receiving a second set of signals relating to at least one object from the displayed array of objects. The at least one object being selected by the user using the pointing device. The preferred method also includes the step of creating a second search string having a value to constrain the second index list based on the second set of signals.

After the second search string is created, the preferred method includes the step of displaying a plurality of entries of the second index list on the display screen. The displayed entries are based on the value of the second search string. An additional step of the preferred method is receiving a signal relating to one of the displayed entries of the second index list. This signal identifies an entry selected by the user using the pointing device.

In the preferred method, the steps of displaying a plurality of entries of the first index and displaying a plurality of entries of the second index include the steps of displaying at least one display control object, such as a page-up or page-down button, for scrolling through the displayed entries; receiving a signal representing the user's selection of display control object; and updating the displayed entries in response to the user's selection.

While the method of the present invention can be implemented to display and process information in any language, the preferred embodiment is implemented in a language which forms words using alphanumeric characters. Hence, in the preferred method, the displayed array of objects would include alphanumeric characters.

Furthermore, the first and second indexes of the preferred method represent either a last name and a first name, respectively, of a traditional "White Pages" directory or a business category and a company name, respectively, of a traditional "Yellow Pages" directory. It has been determined that, in any event, a search string of two or three characters is sufficient to constrain the index lists to a manageable number of entries.

In carrying out the above objects and other objects of the present invention, a system is also provided for carrying out the steps of the abovedescribed method. The system consists of the hardware necessary to implement the method and could include a touch sensitive screen and an electronic stylus.

The above objects and other objects, features and advantages of the present invention are readily apparent from the following detailed description of the best mode for carrying out the invention when taken with the accompanying drawings.

DETAILED DESCRIPTION OF THE PREFERRED EMBODIMENT

In order to simplify the disclosure of the present invention and to provide a concise description of the best mode for practicing this invention, it will be described in connection with a specific operating environment. This user interface is best implemented on a telephony device with either a gray-scale or color graphical display. The telephony device must employ an operating system capable of sending and receiving telephony switch signalling that enables services such as voice messaging, call waiting, three way calling, and other standard services. In addition, a protocol is necessary to provide the information services described in this document.

The telephony device must provide a way for the user to interact with the information on the screen. Possible modes of interaction include a mouse, a touch screen, an electronic stylus or a speech recognition device. The described interface is not dependent on a single interaction mode—rather, each mode can be used based on user preference.

The figures that illustrate this telephony user interface were developed using Supercard software on an Apple Macintosh Quadra computer. The screens represent a proprietary interface design for an Advanced Telephony and Information System ("ATIS"), but do not currently represent a working telephony system.

For the purposes of this description, selecting refers to a specific action performed by the user of the ATIS. To select an object, the user touches the object with an electronic stylus. To double select an object, the user touches the object twice with the electronic stylus.

Yellow Pages Screens

Figure 1:
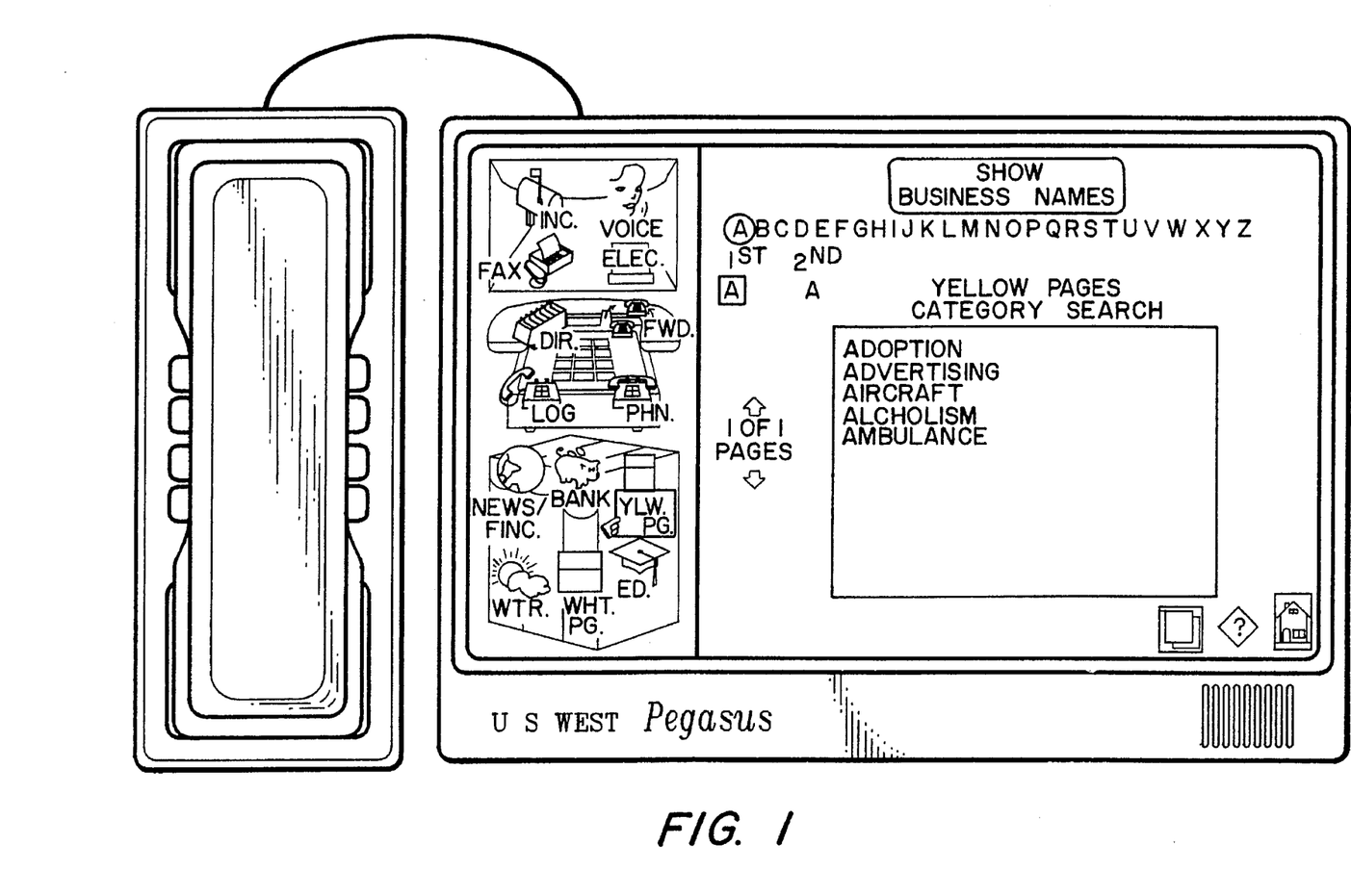
FIG. 1 is a screen display hereinafter referred to as the Yellow Pages category search screen illustrating objects which are processed and displayed to permit a search of a database by a user at a telephone station.

FIG. 1 shows the first of two Yellow Pages screens of the ATIS which is displayed in response to a user selection indicating a desire to search for an entry in the on-line Yellow Pages directory.

The Yellow Pages category search screen is generally divided into two sections. The first section on the left side of the screen displays a number of icons representing applications of the ATIS. The Yellow Pages window is displayed on the right portion of the screen and contains a screen title, a category list, a set of page controls, a show business names button, an array of characters, a search string and a letter indicator. The screen title, located directly above the box surrounding the category list informs the user of the general purpose of the first Yellow Pages screen.

The category list displayed in the box in the center of the Yellow Pages window permits the user to view an alphabetically arranged list of categories from the on-line Yellow Pages directory based on the value of the search string and the page controls. The page controls located to the immediate left of the category list allow the user to page through the category list.

The search string is a combination of up to two alphanumeric characters defined by the user. The user defines each position of the search string by aligning the letter indicator over the desired letter in the array of characters located directly above the search string. As the user defines each successive position of the search string, the category list displays a constrained list of categories which are alphabetically equal to or greater than the value of the search string.

Once the search string has been defined, the user may use the page controls to further locate a desired entry. When the user locates the desired entry, the user must select the desired entry and select the show business names button to display the second Yellow Pages screen.

Figure 2:
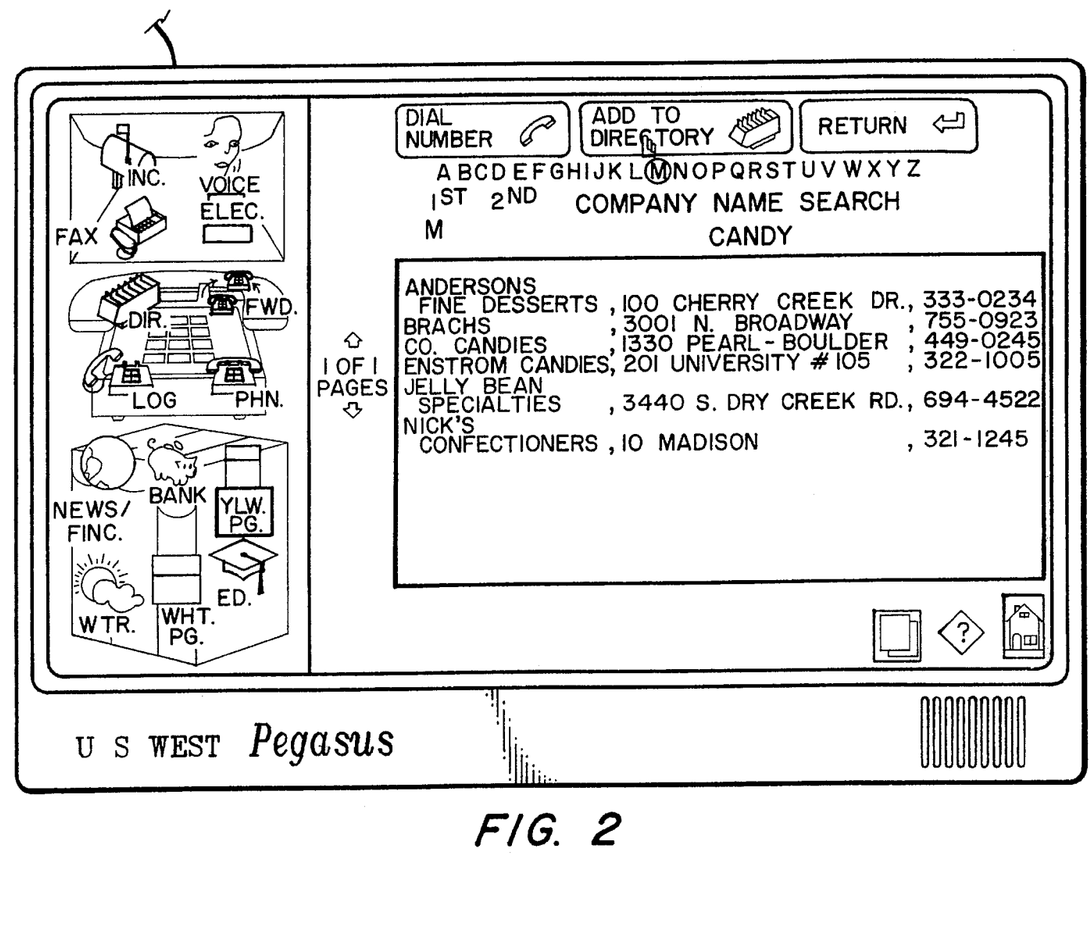
FIG. 2 is a screen display hereinafter referred to as the Yellow Pages company name search illustrating objects which are processed and displayed to permit a search of a database by a user at a telephone station.

FIG. 2 shows the second Yellow Pages screen of the ATIS. The Yellow Pages window on this screen contains a screen title, a category display, a company name list, page controls, a search string, an array of characters, a letter indicator, a dial number button, an add to directory button, and a return button. The screen title, as in FIG. 1, informs the user of the general purpose of the second Yellow Pages screen. The category display located directly above the company name list displays the category selected by the user on the first Yellow Pages screen.

The company name list, displayed in the box in the center of the Yellow Pages Window, permits the user to view a list of alphabetically arranged company names from the on-line Yellow Pages directory based on the category display, the value of the search string, and the page controls. The page controls located to the immediate left of the company name list allow the user to page through the company name list.

The search string displayed beneath the array of characters is a combination of up to two alphanumeric characters defined by the user. The user defines each position of the search string by aligning the letter indicator over the desired letter in the array of characters. As the user defines each successive position of the search string, the company name list displays a constrained list of company names which are alphabetically equal to or greater than the value of the search string.

Once the search string has been defined, the user may use the page controls to further locate the desired entry. To dial the number of the desired entry, the user must select the desired entry and select the dial number button. To add an entry to the user's personal directory, the user must select the desired entry and select the add to directory button. To return to the first Yellow Pages screen, the user must select the return button.

White Pages Screens

Figure 3:
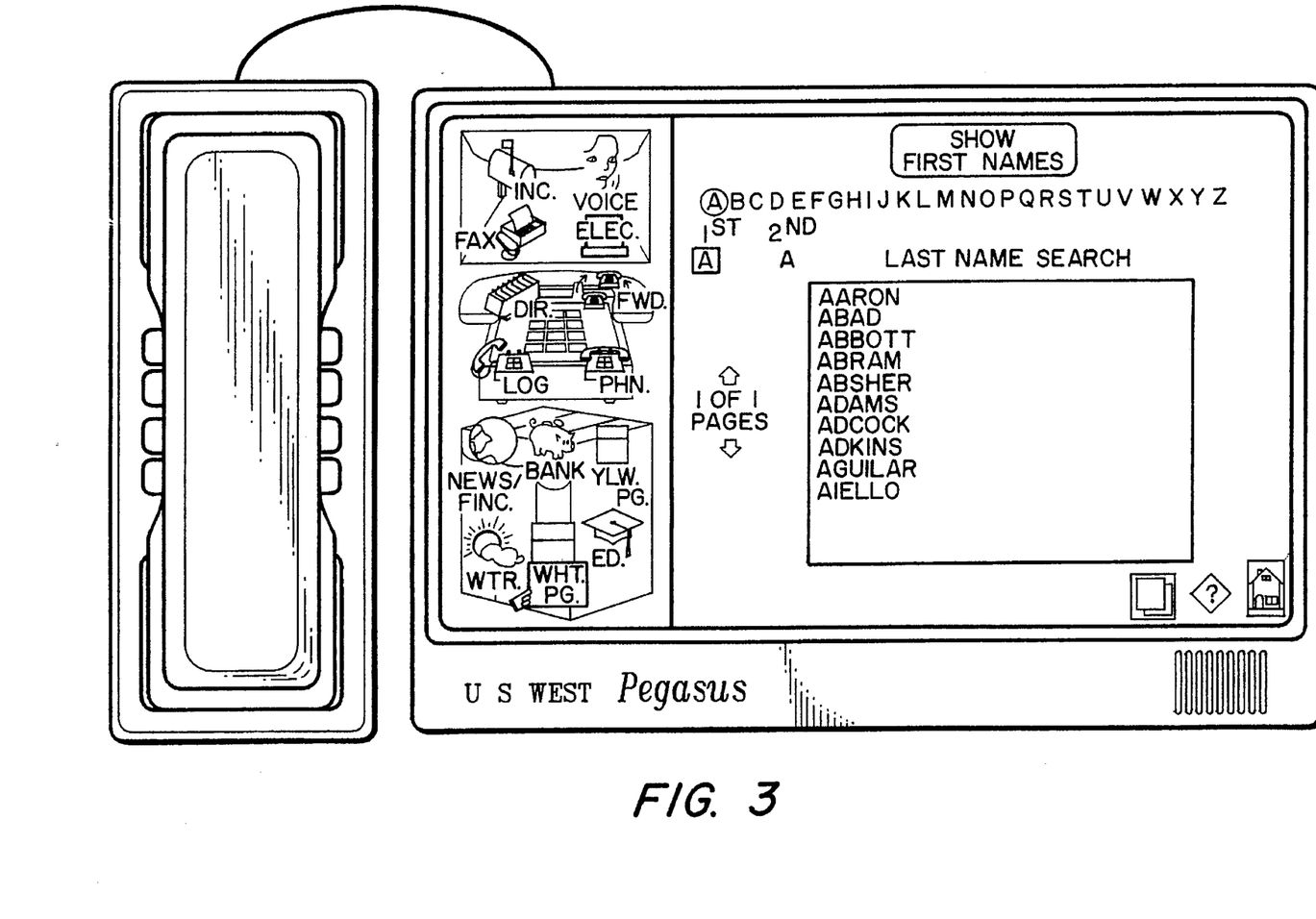
FIG. 3 is a screen display hereinafter referred to as the White Pages last name search screen illustrating objects which are processed and displayed to permit a search of a database by a user at a telephone station.

FIG. 3 shows the first of two White Pages screens of the ATIS which is displayed in response to a user selection indicating a desire to search for an entry in the on-line White Pages directory.

The White Pages last name search screen is generally divided into two sections. The first section on the left side of the screen displays a number of icons representing applications of the ATIS. The White Pages window is displayed on the right portion of the screen and contains a screen title, a last name list, a set of page controls, a show first names button, an array of characters, a search string and a letter indicator. The screen title, located directly above the box surrounding the last name list, informs the user of the general purpose of the first White Pages screen.

The last name list, displayed in the box in the center of the White Pages window, permits the user to view an alphabetically arranged list of last names from the on-line White Pages directory based on the value of the search string and the page controls. The page controls located to the immediate left of the last name list allow the user to page through the last name list.

The search string is a combination of up to two alphanumeric characters defined by the user. The user defines each position of the search string by aligning the letter indicator over the desired letter in the array of characters located directly above the search string. As the user defines each successive position of the search string, the last name list displays a list of last names which are alphabetically equal to or greater than the value of the search string.

Once the search string has been defined, the user may use the page controls to further locate a desired entry. When the user locates the desired entry, the user must select the desired entry and select the show first names button to display the second White Pages screen.

Figure 4:
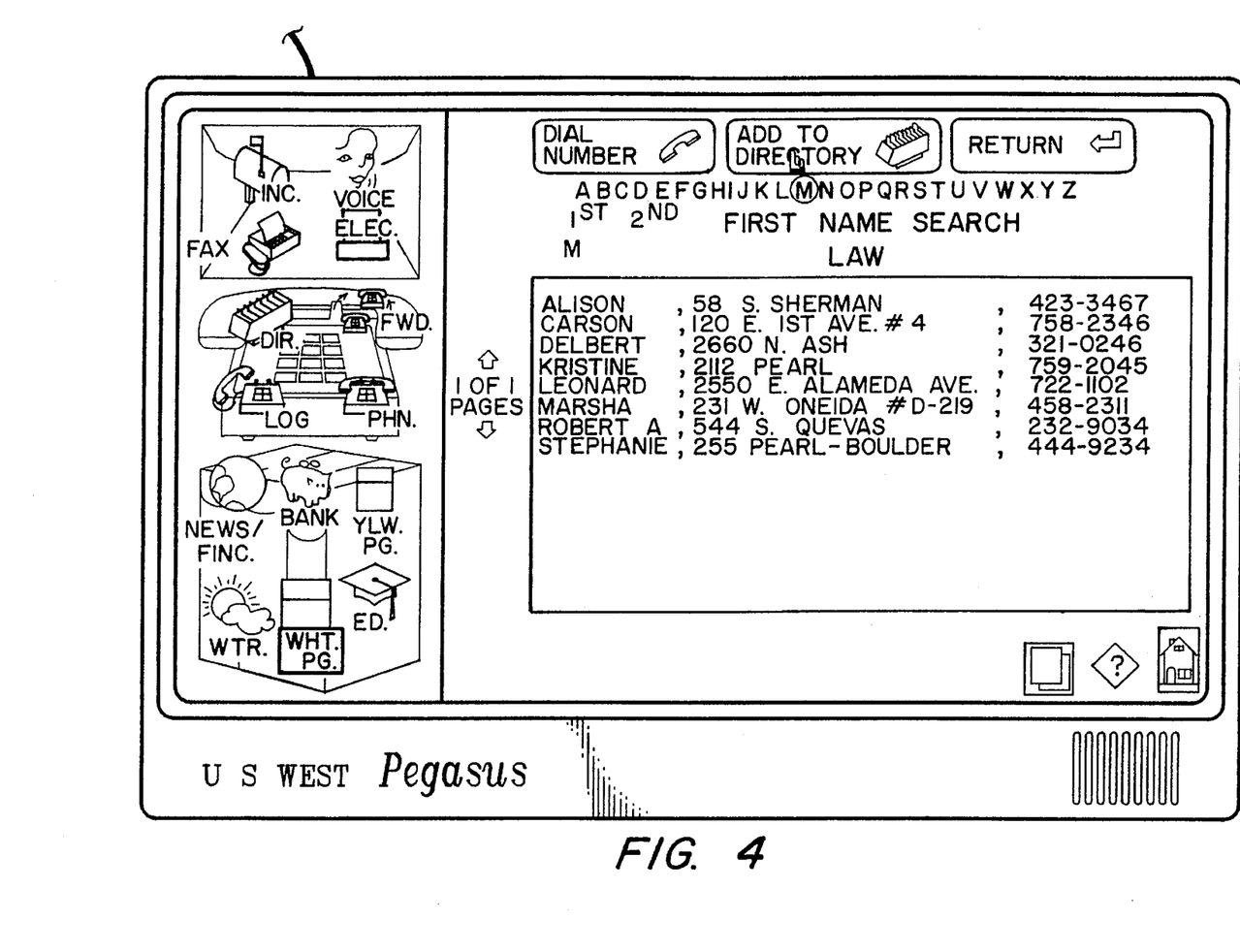
FIG. 4 is a screen display hereinafter referred to as the White Pages first name search screen illustrating objects which are processed and displayed to permit a search of a database by a user at a telephone station.

FIG. 4 shows the second White Pages screen of the ATIS. The White Pages window on this screen contains a screen title, a last name display, a first name list, page controls, a search string, an array of characters, a letter indicator, a dial number button, an add to directory button, and a return button. The screen title, as in FIG. 3, informs the user of the general purpose of the second White Pages screen. The last name display located directly above the first name list displays the last name selected by the user on the first White Pages screen.

The first name list, displayed in the box in the center of the White Pages window, permits the user to view a list of alphabetically arranged first names from the on-line White Pages directory based on the last name display, the value of the search string, and the page controls. The page controls located to the immediate left of the first name list allow the user to page through the first name list.

The search string displayed beneath the array of characters is a combination of up to two alphanumeric characters defined by the user. The user defines each position of the search string by aligning the letter indicator over the desired letter in the array of characters. As the user defines each successive position of the search string, the first name list displays a list of first names which are alphabetically equal to or greater than the value of the search string.

Once the search string has been defined, the user may Use the page controls to further locate the desired entry. To dial the number of the desired entry, the user must select the desired entry and select the dial number button. To add an entry to the user's personal directory, the user must select the desired entry and select the add to directory button. To return to the first Yellow Pages screen, the user must select the return button.

Figure 5:
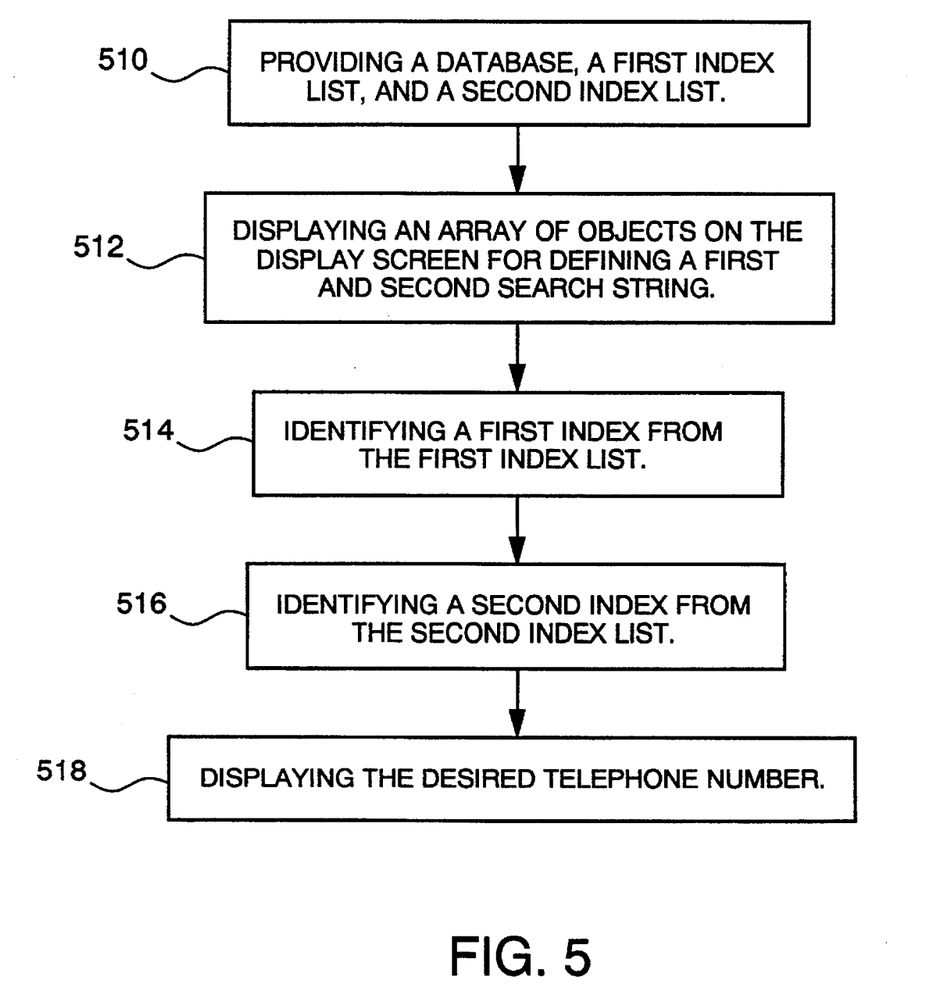
FIG. 5 is a flow chart generally illustrating the steps of the preferred method of the present invention.

Referring now to FIG. 5 there is illustrated the steps of the preferred method of the present invention. As shown in block 510, the first step is providing a data base, a first index list and a second index list. The data base is intended to store a multiplicity of information records including a telephone number, a first index and a second index. Preferably, the first index and the second index are a pair of related fields, such as a business category and a company name or a last name and a first name.

Figure 6:
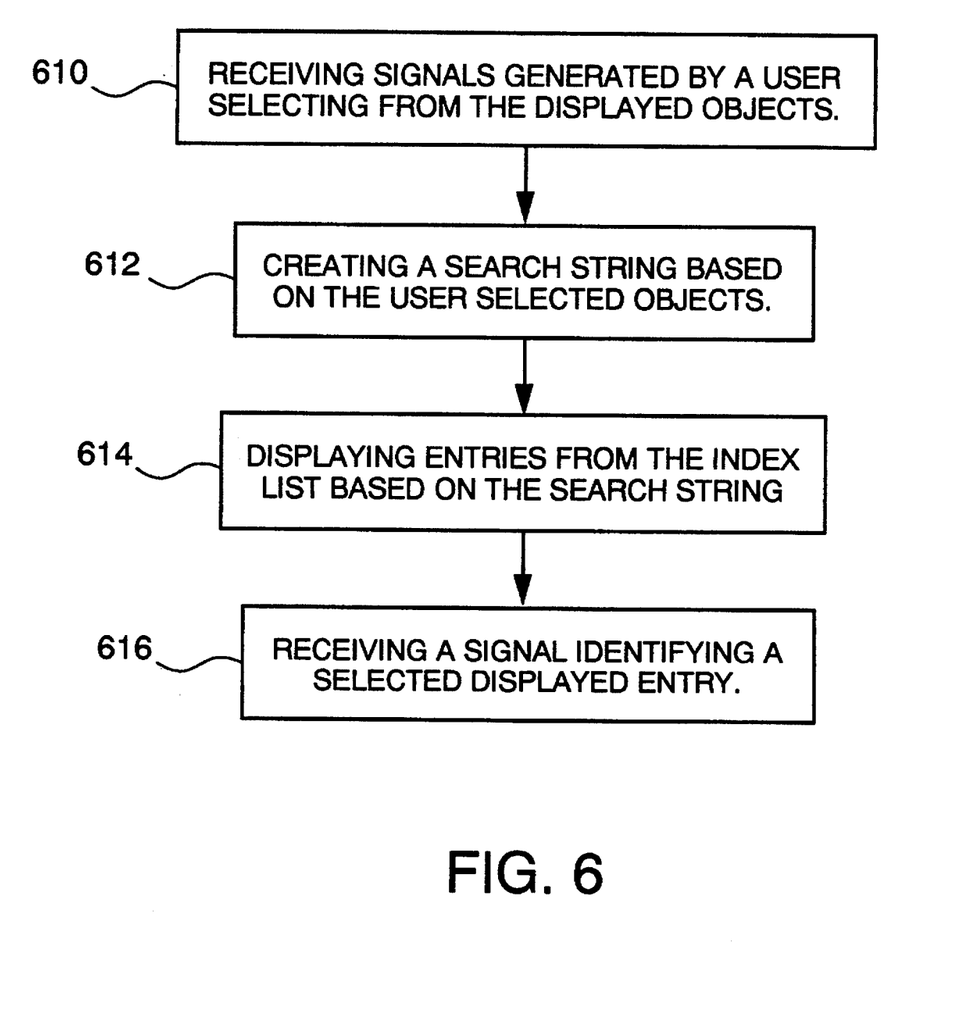
FIG. 6 is a flow chart illustrating the steps relating to identifying a selected entry from an index list.

Block 512 shows the second step of displaying objects on the display screen for defining a first and second search string. Preferably, the objects in the array would be alphanumeric characters. The third step of the preferred method is identifying a first index from the first index list, as shown in block 514. Similarly, block 516 shows the step of identifying a second index from the second index list. FIG. 6 further describes the steps comprising blocks 514 and 516. The final step of the preferred method is displaying the desired telephone number, as shown in block 518.

Referring to FIG. 6, there is illustrated the steps for identifying an index from an index list. Block 610 shows the step of receiving signals generated by a user selecting from the displayed objects. The second step is creating a search string, based on the user selected objects shown in block 612. Typically, the search string will be an array of user selected alphanumeric characters.

The third step of identifying an index from an index list is shown in block 614. This is the step of displaying entries from the index list based on the search string. As described earlier, the user may select from the displayed entries directly or utilized page controls preferably displayed on the display screen. The final step is receiving a signal identifying a selected displayed entry, as shown in block 616. This step completes the identification of an index from an index list.

While the best mode for carrying out the invention has been described in detail, those familiar with the art to which this invention relates will recognize various alternative designs and embodiments for practicing the invention as defined by the following claims.

What is claimed is:

1. A system for processing and displaying objects to permit a search of a database by a user so that the user can obtain a desired telephone number at a telephone station including a computer, a display device connected to the computer, the display device having a display screen adapted to cooperate with a pointing device for selecting objects displayed on the display screen, the system comprising:

the database for storing a multiplicity of information records, the information records including:

a telephone number;
a first index; and
a second index;
a first index list for identifying information records based on the first index;
a second index list for identifying information records based on the second index;
means for displaying an array of objects on the display screen;
means for receiving a first set of signals relating to at least one object from the displayed array of objects, the at least one object selected by the user using the pointing device;
means for creating a first search string having a value to constrain the first index list based on the step of receiving the first set of signals;
means for displaying a plurality of entries of the first index list on the display screen, the displayed entries based on the value of the first search string;
means for receiving a signal relating to one of the displayed entries of the first index list to identify a selected entry, the selected entry identified by the user using the pointing device;
means for receiving a second set of signals relating to at least one object from the displayed array of objects, the at least one object selected by the user using the pointing device;
means for creating a second search string having a value to constrain the second index list based on the step of receiving the second set of signals;
means for displaying a plurality of entries of the second index list on the display screen, the displayed entries based on the value of the first search string and the second search string; and
means for receiving a signal relating to one of the displayed entries of the second index list to identify a selected entry, the selected entry identified by the user using the pointing device; and
means for displaying the desired telephone number on the display screen.

2. The system of claim 1 wherein the means for displaying the plurality of entries of the first index on the display screen includes:
means for displaying at least one display control object on the display screen, the at least one display control object for scrolling the displayed plurality of entries of the first index;
means for receiving a selection of the at least one display control object, the at least one display control object identified by the user using the pointing device; and
means for updating the plurality of entries of the first index on the display screen based on the step of receiving the selection of the at least one display control object.

3. The system of claim 1 wherein the means for displaying the plurality of entries of the second index on the display screen includes:
means for displaying a plurality of entries of the second index on the display screen;
means for displaying at least one display control object on the display screen, the at least one display control object for scrolling the displayed plurality of entries of the second index;
means for receiving a selection of the at least one display control object, the at least one display control object identified by the user using the pointing device; and
means for updating the plurality of entries of the second index on the display screen based on the step of receiving the selection of the at least one display control object.

4. A method for processing and displaying objects to permit a search of a database by a user so that the user can obtain a desired telephone number at a telephone station including a computer, a display device connected to the computer, the display device having a display screen adapted to cooperate with a pointing device for selecting objects displayed on the display screen, the method comprising the steps of:
providing the database for storing a multiplicity of information records, the information records including:
a telephone number;
a first index; and
a second index;
providing a first index list for identifying information records based on the first index;
providing a second index list for identifying information records based on the second index;
displaying an array of objects on the display screen, each object representing an alphanumeric character, each object further being selectable by the user;
receiving a first set of signals relating to at least one object from the displayed array of objects, the at least one object selected by the user using the pointing device;
creating a first search string having a value to constrain the first index list based on the step of receiving the first set of signals;
displaying a plurality of entries of the first index list on the display screen, the displayed entries based on the value of the first search string;
receiving a signal relating to one of the displayed entries of the first index list to identify a selected entry, the selected entry identified by the user using the pointing device;
receiving a second set of signals relating to at least one object from the displayed array of objects, the at least one object selected by the user using the pointing device;
creating a second search string having a value to constrain the second index list based on the step of receiving the second set of signals;
displaying a plurality of entries of the second index list on the display screen, the displayed entries based on the value of the first search string and the second search string;
receiving a signal relating to one of the displayed entries of the second index list to identify a selected entry, the selected entry identified by the user using the pointing device; and
displaying the desired telephone number on the display screen.

5. The method of claim 4 wherein the step of displaying the plurality of entries of the second index on the display screen includes the steps of:
displaying a plurality of entries of the second index on the display screen;
displaying at least one display control object on the display screen, the at least one display control object for scrolling the displayed plurality of entries of the second index;

receiving a selection of the at least one display control object, the at least one display control object identified by the user using the pointing device; and updating the plurality of entries of the second index on the display screen based on the step of receiving the selection of the at least one display control object.

6. The method of claim 4 wherein the first search string has a maximum length of two characters.

7. The method of claim 4 wherein the first search string has a maximum length of three characters.

8. The method of claim 4 wherein the second search string has a maximum length of two characters.

9. The method of claim 4 wherein the second search string has a maximum length of three characters.

10. The method of claim 4 wherein the first index represents a last name and the second index represents a first name.

11. The method of claim 4 wherein the first index represents a business category and the second index represents a business name.

12. The method of claim 4 wherein the step of displaying the plurality of entries of the first index on the display screen includes the steps of:

displaying at least one display control object on the display screen, the at least one display control object for scrolling the displayed plurality of entries of the first index;

receiving a selection of the at least one display control object, the at least one display control object identified by the user using the pointing device; and updating the plurality of entries of the first index on the display screen based on the step of receiving the selection of the at least one display control object.

* * * * *